(12) United States Patent
Rodriguez

(10) Patent No.: US 12,109,854 B2
(45) Date of Patent: Oct. 8, 2024

(54) TIRE BAR AND METHOD OF USING THE TIRE BAR TO UNSTICK A VEHICLE

(71) Applicant: Henry Rodriguez, Santa Clara, CA (US)

(72) Inventor: Henry Rodriguez, Santa Clara, CA (US)

(73) Assignee: Jeffrey S. Melcher, Boca Raton, FL (US)

( * ) Notice: Subject to any disclaimer, the term of this patent is extended or adjusted under 35 U.S.C. 154(b) by 711 days.

(21) Appl. No.: 17/113,675

(22) Filed: Dec. 7, 2020

(65) Prior Publication Data

US 2021/0178810 A1 Jun. 17, 2021

Related U.S. Application Data

(60) Provisional application No. 63/115,897, filed on Nov. 19, 2020, provisional application No. 62/948,391, filed on Dec. 16, 2019.

(51) Int. Cl.
*B60C 27/04* (2006.01)
*B60B 15/26* (2006.01)
*B60C 27/02* (2006.01)

(52) U.S. Cl.
CPC ............ *B60C 27/04* (2013.01); *B60B 15/266* (2013.01); *B60C 27/0269* (2013.01); *B60B 2900/551* (2013.01)

(58) Field of Classification Search
CPC ....... B60B 15/266; B60B 15/26; B60C 27/02; B60C 27/023; B60C 27/0261; B60C 27/0269; B60C 27/04
See application file for complete search history.

(56) References Cited

U.S. PATENT DOCUMENTS

| | | | | | |
|---|---|---|---|---|---|
| 2,443,406 | A | * | 6/1948 | Thompson | B60C 27/04 152/225 R |
| 3,045,738 | A | * | 7/1962 | Lombardi | B60C 27/04 152/225 R |
| 3,071,173 | A | * | 1/1963 | Martin | B60C 27/045 152/216 |
| 3,122,192 | A | * | 2/1964 | Seidell | B60C 27/04 152/225 R |
| 3,847,196 | A | * | 11/1974 | Gomez | B60C 27/04 152/219 |

(Continued)

*Primary Examiner* — Jason R Bellinger
(74) *Attorney, Agent, or Firm* — Jeffrey S. Melcher; Melcher Patent Law PLLC

(57) ABSTRACT

A tire bar having an elongated body 11. A traction section 12 is disposed at a first end of the elongated body 11. The traction section 12 is configured to be mounted over a tire tread on a vehicle wheel. The traction section 12 has an inner surface 14 configured to contact the treads of a wheel and an outer traction surface 2 configured to contact a driving surface. The inner surface 14 opposes the outer traction surface 2. A lug contact section 16 has a lug connector 1 configured to contact at least one lug nut on a wheel. The lug contact section 16 is configured to be movable along a length of the elongated body 11 to vary a distance between the lug section 16 and the traction section 12. A locking structure 4 is configured to lock the lug contact section 16 at a position on the elongated body 11. A method of unsticking a vehicle by rotating a wheel having the tire bar connected to the wheel.

19 Claims, 15 Drawing Sheets

(56) References Cited

U.S. PATENT DOCUMENTS

| | | | | |
|---|---|---|---|---|
| 3,935,891 | A * | 2/1976 | McCloud | B60B 15/266 |
| | | | | 152/220 |
| 4,306,604 | A * | 12/1981 | Snider | B60C 27/02 |
| | | | | 301/41.1 |
| 4,386,643 | A * | 6/1983 | Belknap, III | B60C 27/04 |
| | | | | 152/216 |
| 5,156,695 | A * | 10/1992 | Martin | B60C 27/04 |
| | | | | 152/216 |
| 7,426,949 | B2 * | 9/2008 | Chaisson, Jr. | B60C 27/04 |
| | | | | 152/218 |
| 9,487,056 | B1 * | 11/2016 | Dolios | B60C 27/0269 |
| 10,343,452 | B2 | 7/2019 | Rodriguez | |
| 10,744,818 | B1 * | 8/2020 | Baker | B60B 15/26 |
| 10,913,309 | B2 * | 2/2021 | Li | B60B 15/00 |

\* cited by examiner

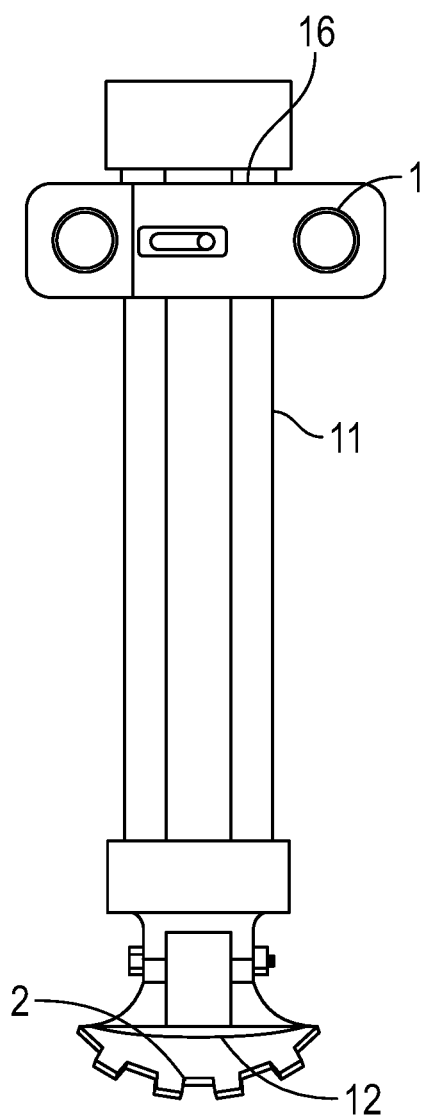
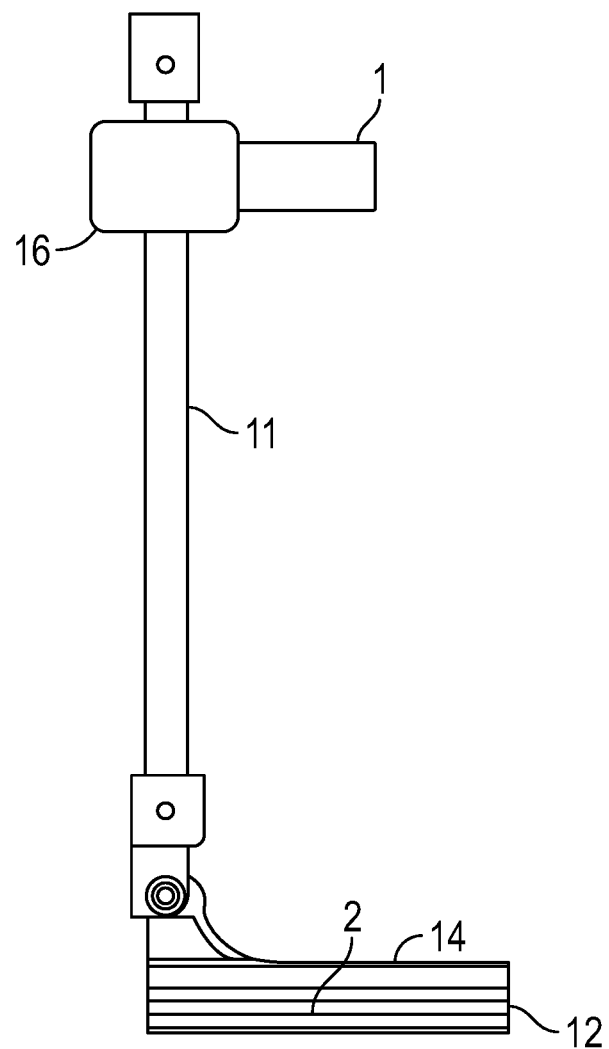
FIG. 1A
FIG. 1B

TIRE BAR AND METHOD OF USING THE TIRE BAR TO UNSTICK A VEHICLE

FIELD OF THE INVENTION

The invention relates to a tire bar and a method of using the tire bar to unstick a trapped vehicle.

BACKGROUND OF THE INVENTION

When vehicles, such cars, vans, trucks, and busses become stuck, such as in sand, mud, soft dirt, gravel, ice snow or other situations often an expensive tow truck is required to unstick the vehicle. Tire chains are heavy and difficult to install and remove, especially when the vehicle is already stuck before the tire chains are installed. Furthermore, tire chains must be sized properly for a specific tire. The Tracgrabber® sold on Amazon® cinches to the tire and is difficult to install. The belt must be fed entirely around the tire and through the rim of the wheel.

There is a need for an easy to attach device to unstick vehicles.

SUMMARY OF THE INVENTION

An objective of the invention is to provide a device that can be easily mounted and removed from a wheel of a vehicle without having to feed a cable through the rim or around the tire. The device easily adjusts to different wheel sizes. Furthermore, the device can easily be mounted on a wheel stuck in mud, sand, soft dirt, gravel, ice, or snow. Moreover, the device is light and easy to carry in a vehicle.

The objectives of the invention can be obtained by a quick disconnect tool comprising:
  an elongated body,
  a traction section at a first end of the elongated body and extending from a surface of the elongated body, the traction section is configured to be mounted over treads on a wheel of a vehicle, the traction section has an inner surface configured to contact the treads of the wheel and an outer traction surface configured to contact a driving surface, the inner surface opposing the outer traction surface; and
  a lug contact section comprising at least one lug connector configured to contact at least one lug nut on the wheel, the lug contact section is configured to be movable along a length of the elongated body to vary a distance between the lug section and the traction section.

The objectives of the invention can also be obtained by a method of unsticking a vehicle comprising:
  providing a tire bar comprising an elongated body, a traction section at a first end of the elongated body and extending from a surface of the elongated body, the traction section is configured to be mounted over treads on a wheel mounted on a vehicle, the traction section has an inner surface configured to contact the treads of the wheel and an outer traction surface configured to contact a driving surface, the inner surface opposing the outer traction surface, a lug contact section comprising at least one lug connector configured to contact at least one lug nut on a wheel, the lug contact section is configured to be movable along a length of the elongated body to vary a distance between the lug section and the traction section;
  adjusting a distance between the lug contact section and the traction section;
  attaching the lug contact section to at least one lug nut on the wheel and attaching the inner surface of the traction section to the treads on the wheel; and
  rotating the wheel so that the traction section contacts a driving surface and moves the vehicle.

BRIEF DESCRIPTION OF THE DRAWINGS

FIG. 1A illustrates front view of a tire bar.
FIG. 1B illustrates a side view of the tire bar.

DETAILED DESCRIPTION OF THE INVENTION

Figure 2A:
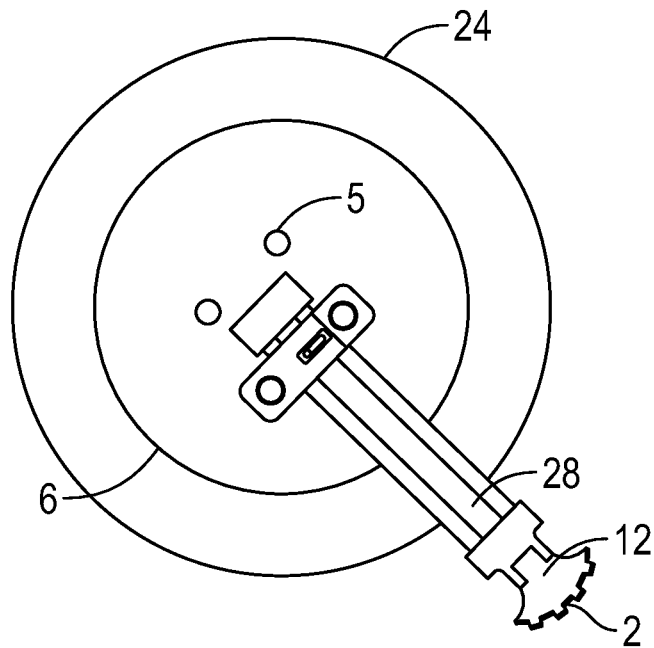
FIG. 2A illustrates a view of the tire bar mounted on a wheel having 4 lug nuts.

The invention will now be explained with reference to the attached non-limiting drawings.

FIGS. 1A through 6B illustrate a tire bar having an elongated body 11. A traction section 12 is disposed at a first end of the elongated body 11. The traction section 12 is configured to be mounted over the treads 25 on a vehicle wheel 24. The traction section 12 extends a length 20 from a back surface of the elongated body. The traction section 12 has an inner surface 14 configured to contact the treads 20 of a wheel 24 and an outer traction surface 2 configured to contact a driving surface 30. The inner surface 14 is preferably concave, but can be flat or any another shape as desired. The inner surface 14 can have protrusions, ridges, grooves, or other structures to enhance grip between the inner surface 14 and the treads 25 of a wheel 24 so that during turning of the wheel 24 the traction section 12 turns with the wheel 24. The inner surface 14 opposes the outer traction surface 2. A lug contact section 16 has a lug connector 1 configured to contact at least one lug nut on a wheel. The lug contact section 16 is configured to be movable along a length of the elongated body 11 to vary a distance between the lug section 16 and the traction section 12. A locking structure 4 is configured to lock the lug contact section 16 at a position on the elongated body 11. Thus, when installed on a wheel 24, the distance between the lug contact section 16 and the traction 12 can be adjusted so that the inner surface 14 rests against the treads 25 on wheel 24. The wheel 24 can be a rim 29 with a tire 27 mounted thereon or a solid one-piece wheel.

Figure 2B:
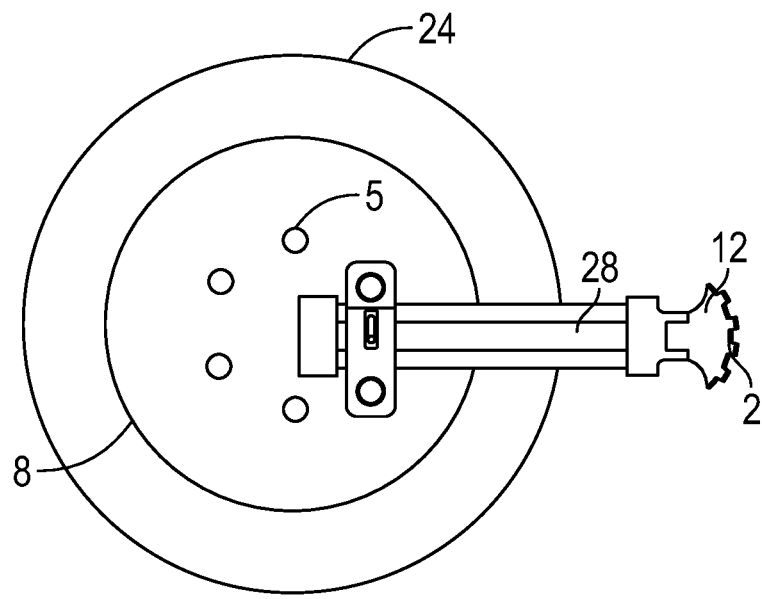
FIG. 2B illustrates a view of the tire bar mounted on a wheel having 6 lug nuts.
Figure 2C:
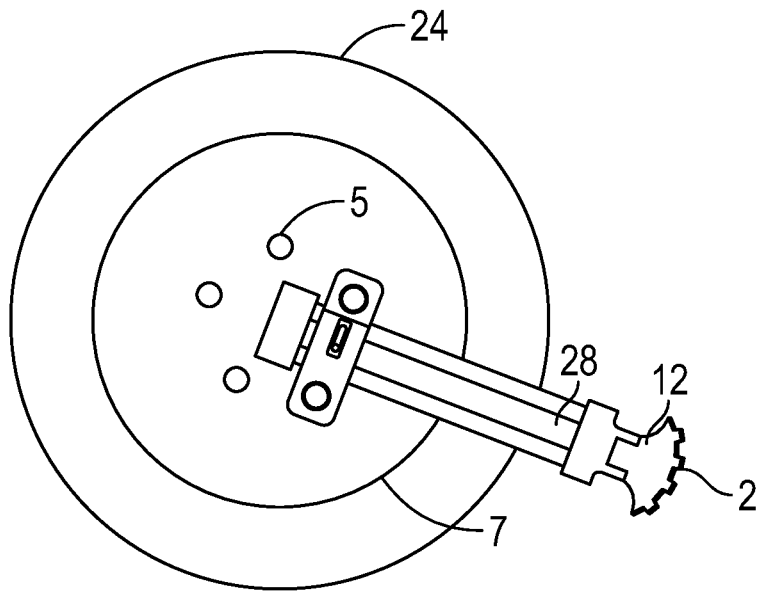
FIG. 2C illustrates a view of the tire bar mounted on a wheel having 5 lug nuts.
Figure 2D:
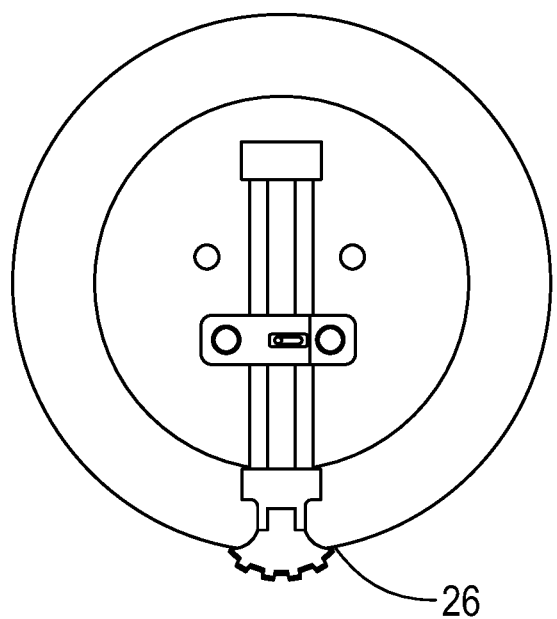
FIG. 2D illustrates a view of the tire bar mounted on a wheel.

FIG. 2A shows a wheel 24 having four lugs 5. FIG. 2B shows a wheel 24 having six lugs 5. FIG. 2C shows a wheel 24 having five lugs 5. The lug section 12 can be easily mounted on the lugs 5 of any wheel 24 as shown in FIGS. 2A through 2C.

The traction section 12 can be foldable for easier storage of the tire bar. As shown in FIGS. 5A-5G, the traction section 12 is mounted to the elongated body 11 by a movable joint 50. The movable joint 50 allows the traction section 12 to fold into a storage position shown in FIG. 5B and an extended position shown in FIG. 5A. Any suitable movable joint 50 can be used, such as the joint bolt 52 that mounts through the holes 51 in the elongated body 11 and hole 53 in the traction section 12, which is secured by the joint nut 54. The traction section preferably has a stop 56 that stops against the stop 57 on the elongated body 11 to prevent the traction section 12 from extending too far, preferably not past about 90 degrees, from the elongated body 11.

The outer traction surface 2 preferably contains a surface that enhances traction to the driving surface 30, such as grooves, ridges, spikes, studs, paddles, treads, or any other desired traction enhancing structure. The driving surface 30 can be a road, dirt, mud, gravel, sand or any other surface that vehicle can drive on.

Figure 4A:
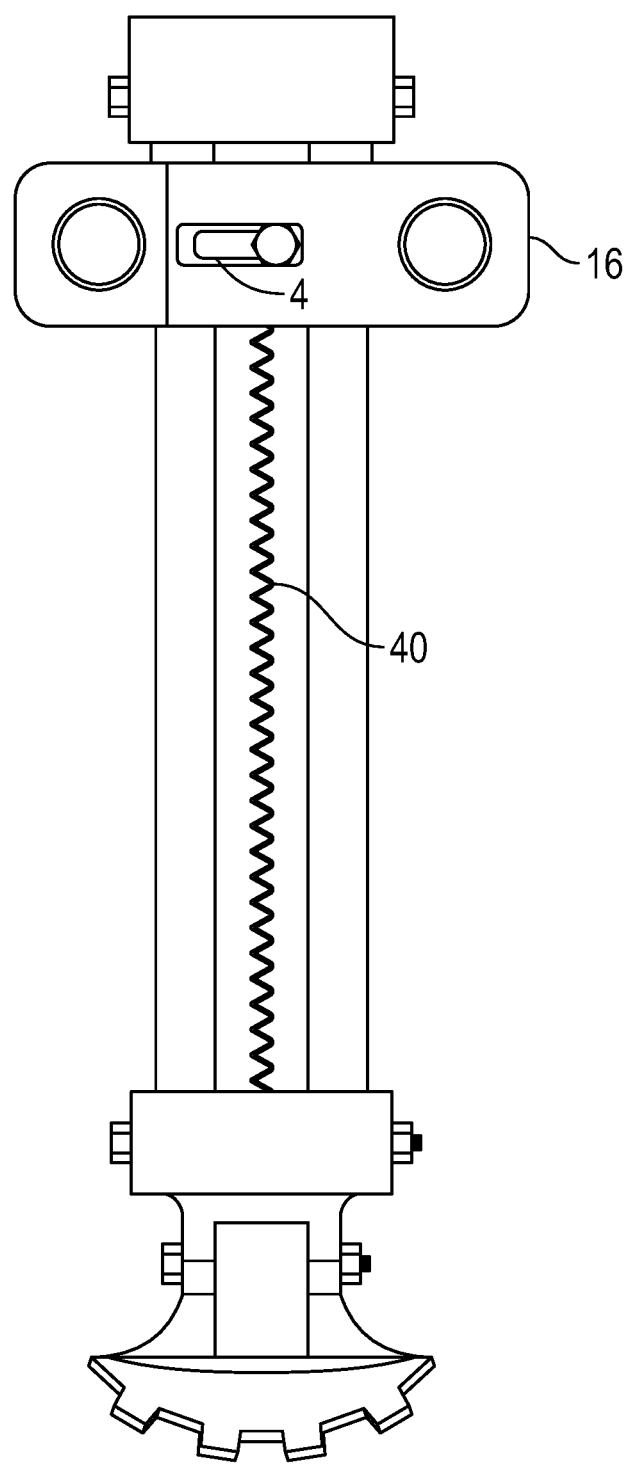
FIG. 4A illustrates a view of a sliding cavity on the tire bar.
Figure 4B:
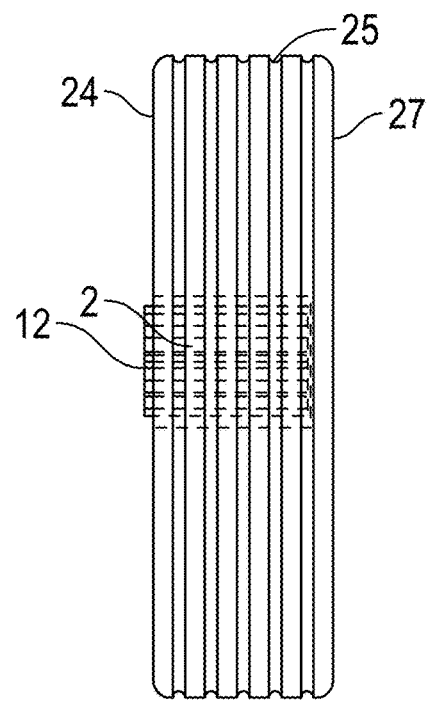
FIG. 4B illustrates a view of the tire bar mounted on a wheel.
Figure 4C:
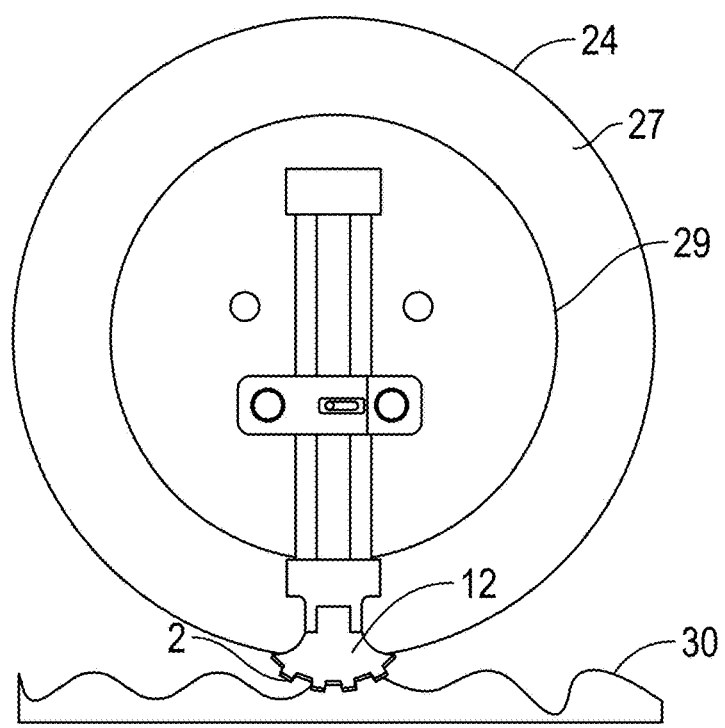
FIG. 4C illustrates a view of the tire bar lifting a wheel off of the driving surface.
Figure 5A:
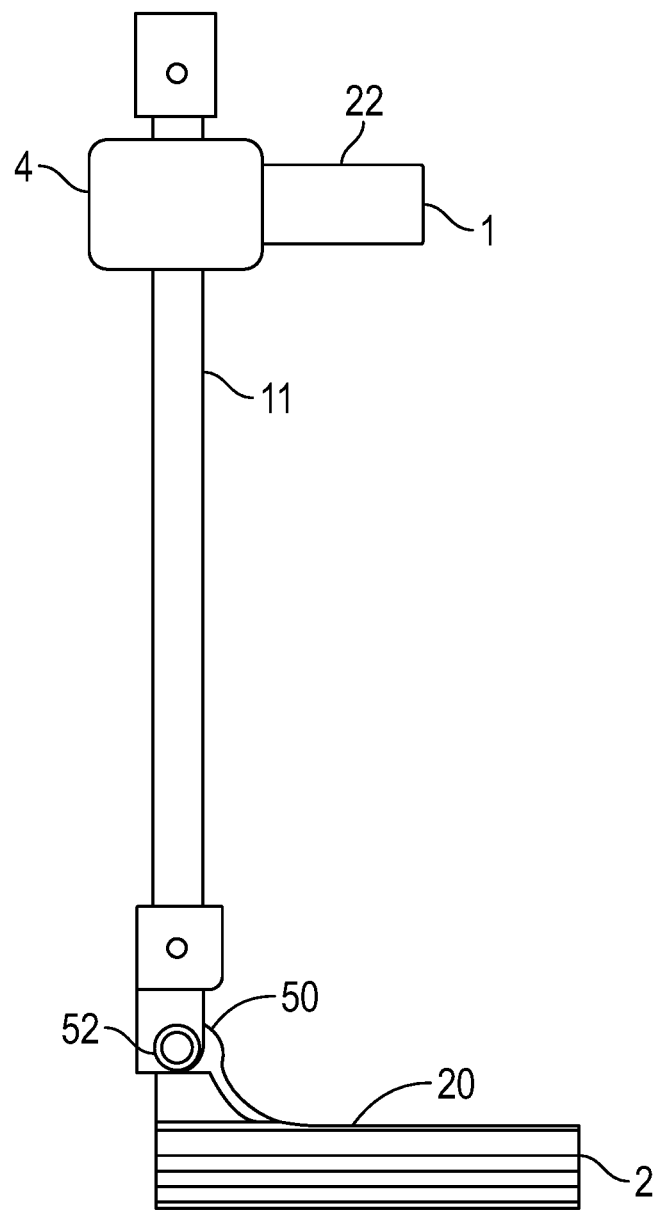
FIG. 5A illustrates a tire bar having a foldable traction section in the extended position.
Figure 5B:
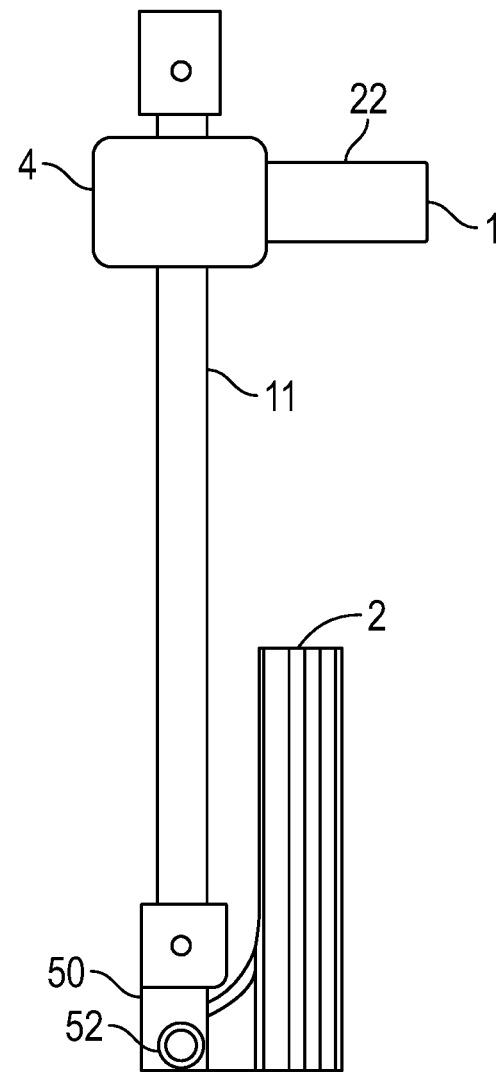
FIG. 5B illustrates a tire bar having a foldable traction section in the storage position.
Figure 5C:
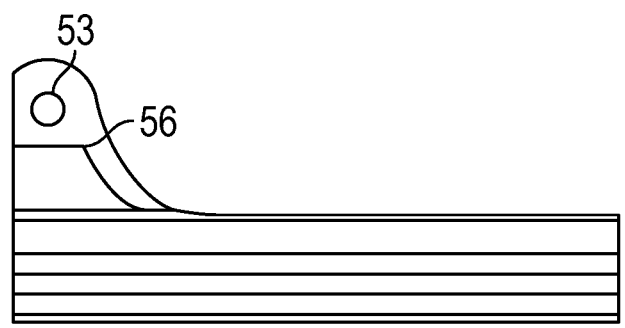
FIG. 5C illustrates a side view of the foldable traction section.
Figure 5D:
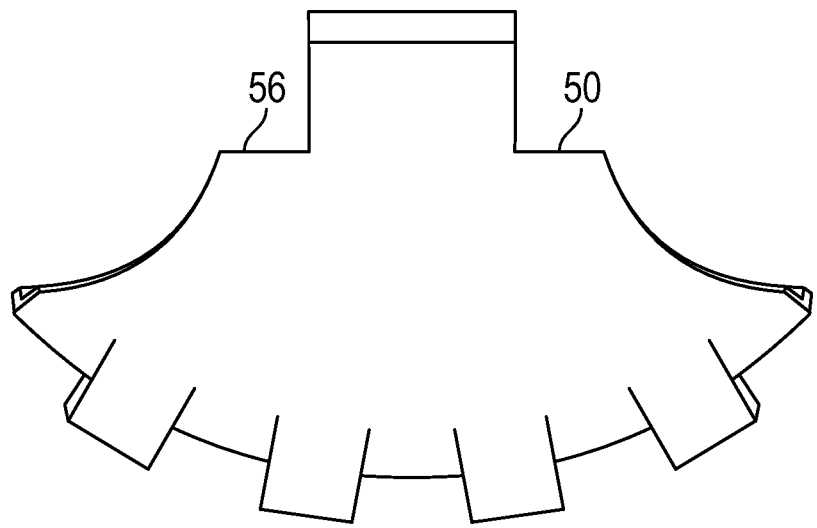
FIG. 5D illustrates a front view of the foldable traction section.
Figure 5E:
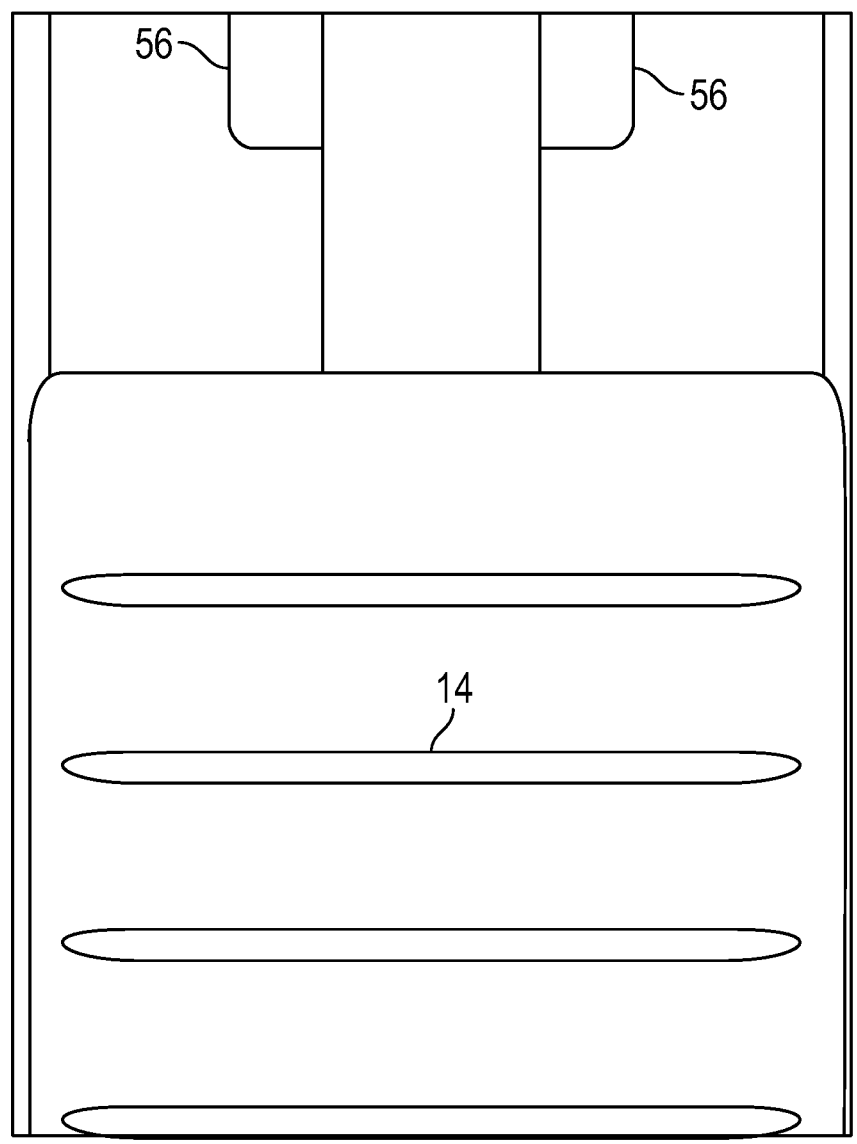
FIG. 5E illustrates a top view of the foldable traction section.
Figures 5F, 5G:
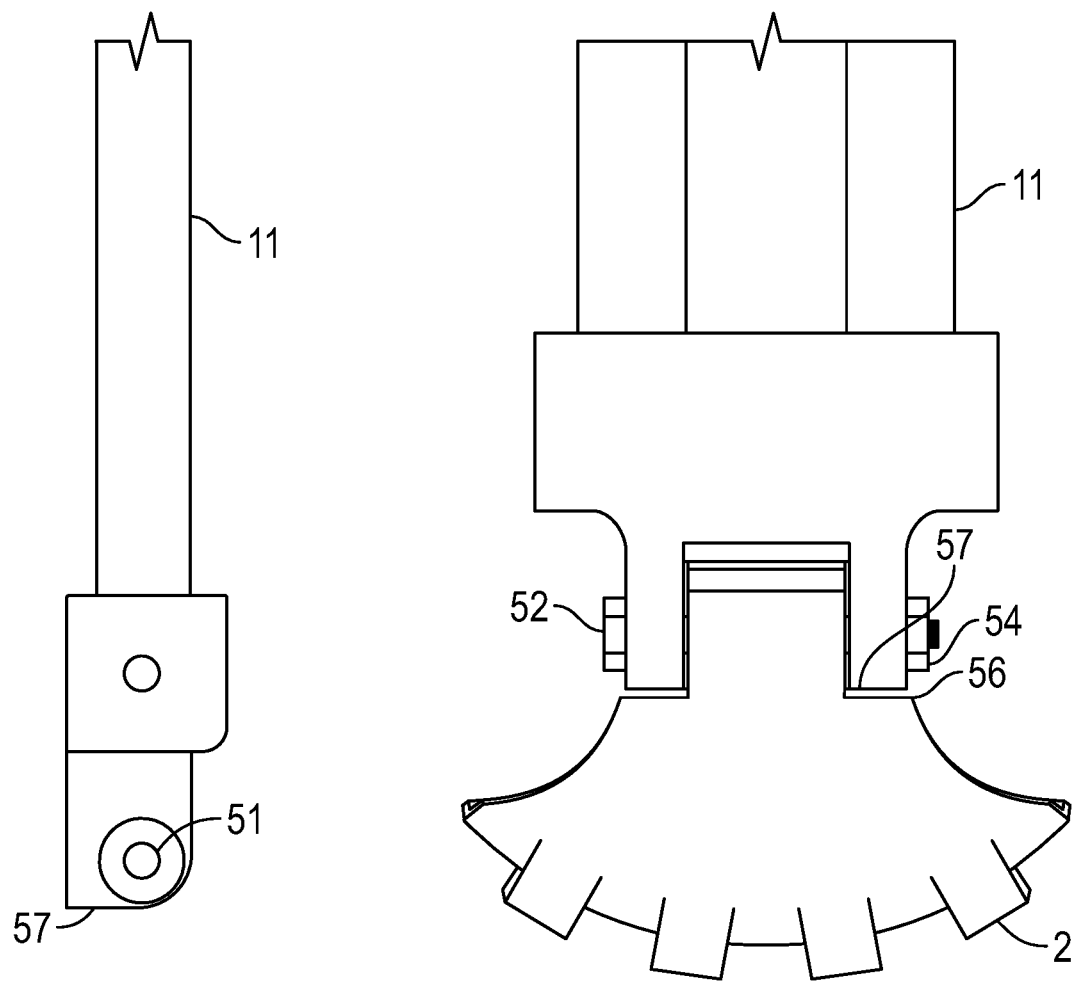
FIG. 5F illustrates a side view of the elongated body configured to mount the foldable traction section.
FIG. 5G illustrates a view of the foldable traction section mounted to the foldable traction section.

The traction section 12, elongated body 11 and lug contact section 16 can be any desired size. The elongated body 11 should be a length to provide the lug connector 1 to connect to a lug 5 and the inner surface 14 to contact the treads of the wheel 24. Examples of suitable lengths for the elongated body 11 are from about 6 inches to about 4 feet, preferably about 6 inches to about 2 feet for passenger vehicles and about 10 inches to about 3 feet for trucks and busses. Preferably, a length 20 of the traction section 12 is about the same thickness (width) of the wheel 24 or less, as shown in FIG. 4B, however, the length 20 can be any desired amount. Examples of the length 20 are from about 1 inch to about 16 inches for passenger vehicles and from about 6 inches to about 24 inches for larger trucks and busses. The thickness of the traction section 12, which is the distance between the inner surface 14 and the traction surface 2, can be any desired thickness, for example, from 0.5 inch to about 12 inches, preferably about 1 inch to about 6 inches. As shown in FIG. 4c, as the wheel 24 is rotated, the vehicle is lifted up from the driving surface 30 by the thickness of the traction section 12 when the traction section 12 is between the wheel 24 and the driving surface 30. The outer traction surface 2 can be angled or sloping as shown in FIG. 4C so that as the wheel is turned the angle or slope allows lifting of the vehicle less abrupt. During rotating of the wheel 24, when the traction surface 2 contacts the driving surface 30 the vehicle can be propelled forward or backward depending on the direction of rotation of the wheel 24.

The tire bar can be formed from any suitable materials, such as metals, rubbers, plastics, composites, and polymers.

As shown in the Figs., the lug connector 1 can be in the shape of a cylinder having an opening that fits over and around a lug 5. The inside surface of the lug connector 1 can be shaped as desired, such as circular (in the cylinder shown in the drawings), square, triangular, hexagon or any other shape, including a socket. If desired, the lug connector 1 can utilize the quick disconnect tool to connect the tire bar to a lug nut, which is described in my previous U.S. Pat. No. 10,343,452, the completed disclosure of which is incorporated herein by reference. The lug connector 1 can be formed of a rigid material, such as plastic, polymer, metals, or composites, and have an inner surface formed from a deformable material, such as rubber, to fit snuggly to a lug nut 5 on the wheel 24, i.e. the deformable material conforms at least partially to the shape of the lug nut 5.

Preferably, the lug contact section comprises two lug connectors 1 as shown in the Figs. so that the tire bar can be mounted to two lug nuts 5. When there are two or more lug connectors 1, different sized lug contact sections 16 having different distances between the lug connectors 1 can be provided to fit different lug nut patterns, such as those shown in FIGS. 2A-2C. Alternatively, the lug contact section 16 can be configured so that the distance between two or more lug connectors 1 can be adjusted.

The tire bar can be used to unstick a vehicle stuck in mud, gravel, sand, snow, ice, loose ground or other driving surfaces. The tire bar can easily be installed on a vehicle wheel 24 as shown in FIGS. 4B and 4C. First, the locking structure 4 is loosened so that the lug contact section 16 can move within the sliding cavity 3. The lug contact section 16 is moved to a position where the lug connector 1 slides over a lug nut 5 on the vehicle wheel 24 as shown in FIGS. 2A-2C. A gap 28 between the inner surface 14 and treads 25 on the wheel 24 should be removed by moving the lug contact section 16 along the elongated body 11 to remove the gap 28, so that the inner surface 14 contacts the treads 25 on the wheel 24 as shown at 26 in FIG. 2D. The locking structure 4 can then be locked to lock the lug contact section 16 to the elongated body 11 so that the lug contact section 16 cannot slide within the sliding cavity 3.

Once the tire bar is installed on the wheel 24, the wheel 24 need only be rotated, such as by a vehicle engine, so that when the outer traction surface 12 contacts the driving surface 30 as shown in FIG. 4C the vehicle can be propelled forward or backward depending on the direction of rotation of the wheel 24 and/or the vehicle can be lifted by the thickness of the traction section 12. The force between the treads 25 and the inner surface 14 when the weight of the vehicle is on the inner surface 14 keeps the traction section 12 in place against the treads 25. When the wheel 24 comprises a tire 25, the treads 25 are tire treads. The tire bar is surprisingly easy to use to unstick a car. It was surprising and unexpected that no hard connection to the lug nut(s) 5 or wheel 24 is required for operation of the tire bar. The tire bar stayed mounted on the wheel 24 even though the lug connector 1 was merely slid over a lug nut 5 with no fasteners required. Thus, the tire bar is preferably a slip on-slip off device that requires not hard fasteners.

An example of a suitable locking structure 4 is shown FIGS. 3A-3E, which includes locking threads 9 on the lug contact section 16 and a locking nut 19 having internal threads 10 configured to accept the threads 9. The locking structure 4 can be locked by tightening the locking nut 19 threads 10 on the threads 9 s shown in FIG. 3A to lock the lug contact section 16 in a desired position on the elongated body 11. The locking structure 4 can be unlocked by loosening the locking nut 19 threads 10 from the threads 9 so that the lug contact section 16 can be moved to a desired position on the elongated body 11.

Figure 3A:
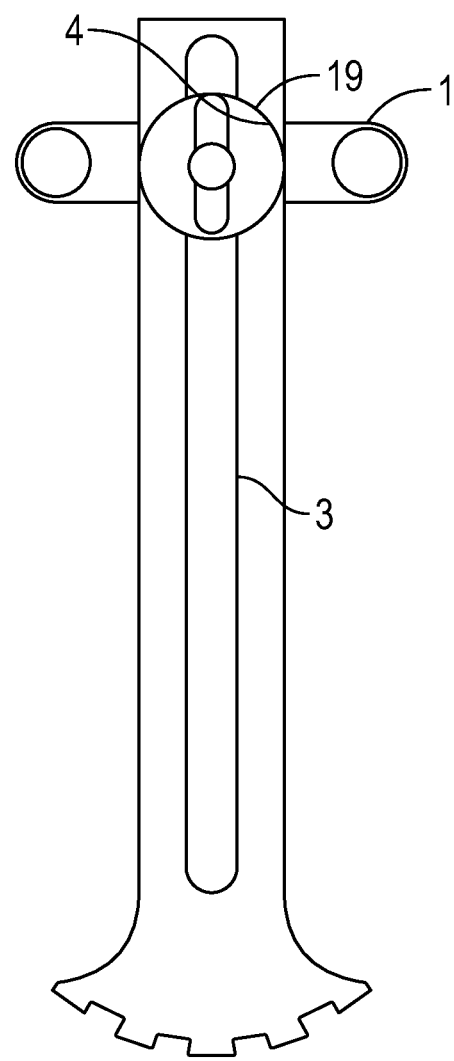
FIG. 3A illustrates a side view of the tire bar.
Figure 3B:
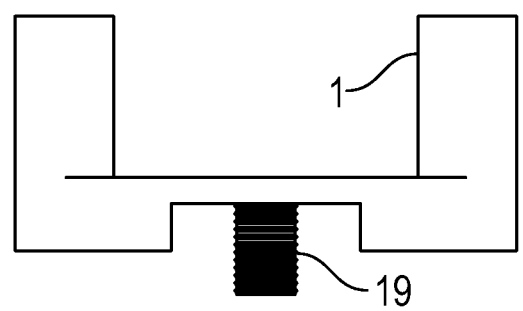
FIG. 3B illustrates a side view of a socket section.
Figure 3C:
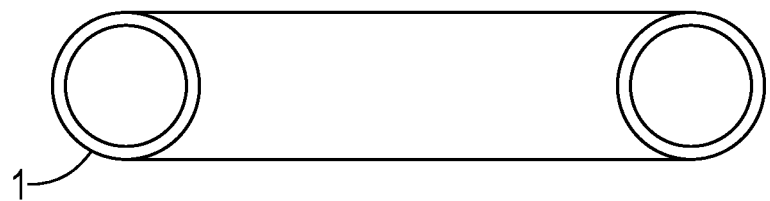
FIG. 3C illustrates a top view of a socket section.
Figure 3D:
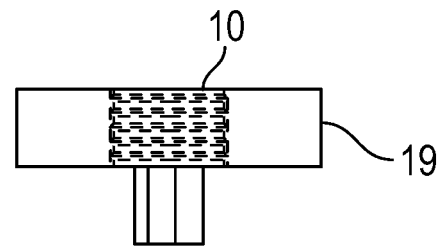
FIG. 3D illustrates a side view of a locking nut.
Figure 3E:
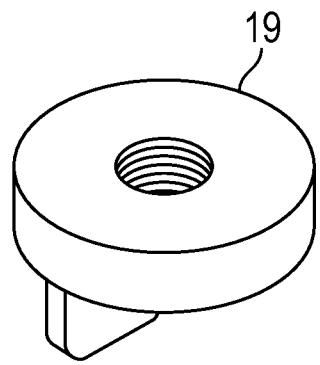
FIG. 3E illustrates a perspective view of the locking nut.
Figure 3F:
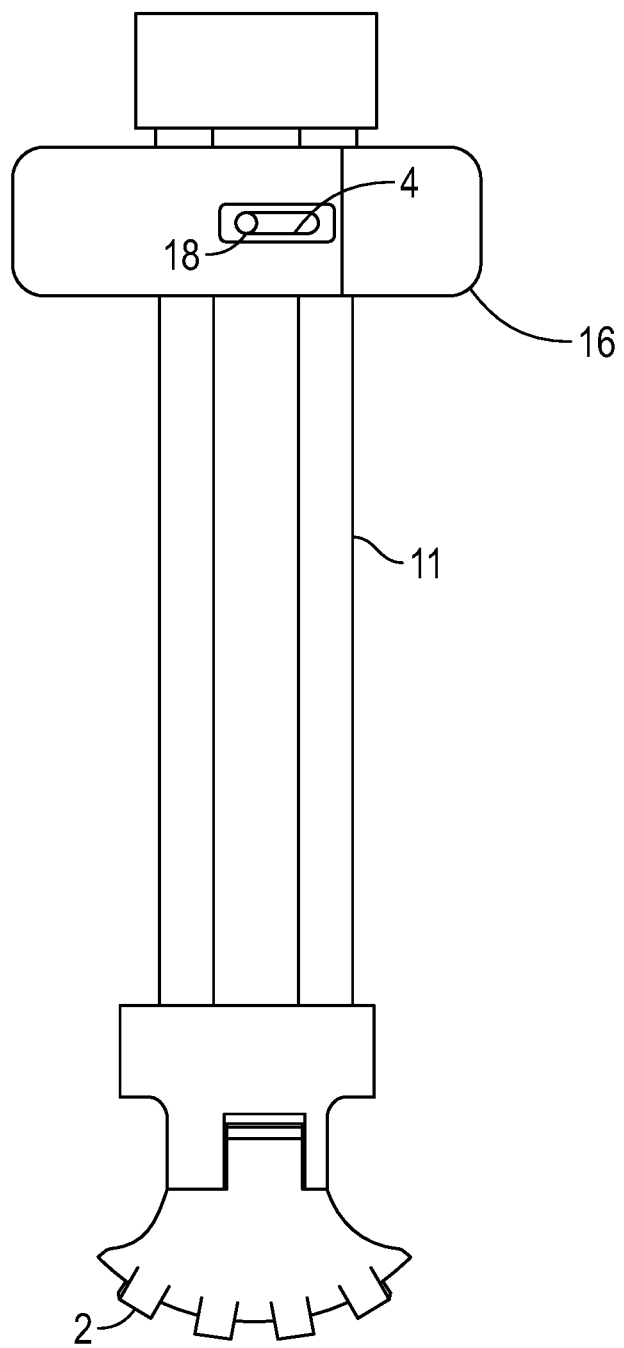
FIG. 3F illustrates a side view of an alternative locking structure.
Figure 3G:
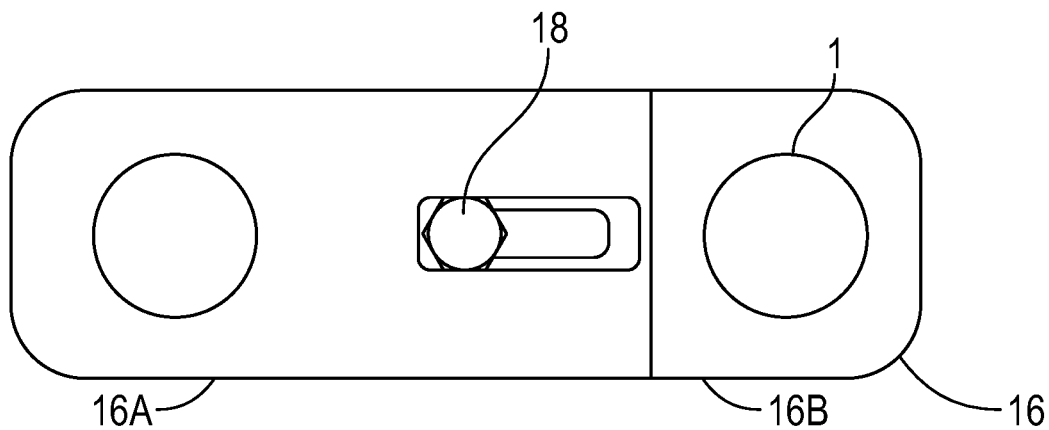
FIG. 3G illustrates a back view of an alternative locking structure locked in a first position.
Figure 3H:
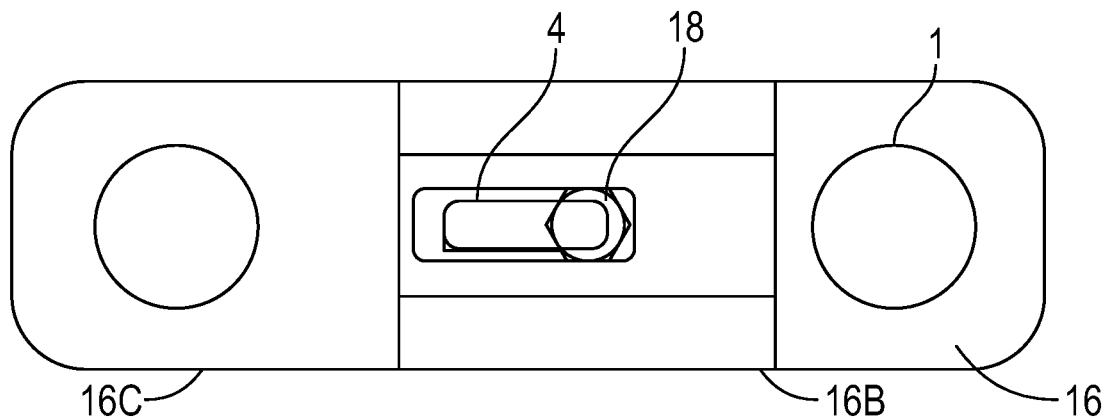
FIG. 3H illustrates a back view of an alternative locking structure locked in a second position.
Figure 3I:
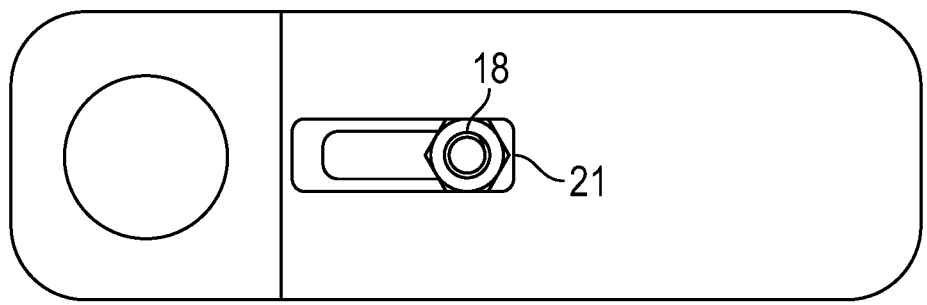
FIG. 3I illustrates a front view of an alternative locking structure.
Figure 6A:
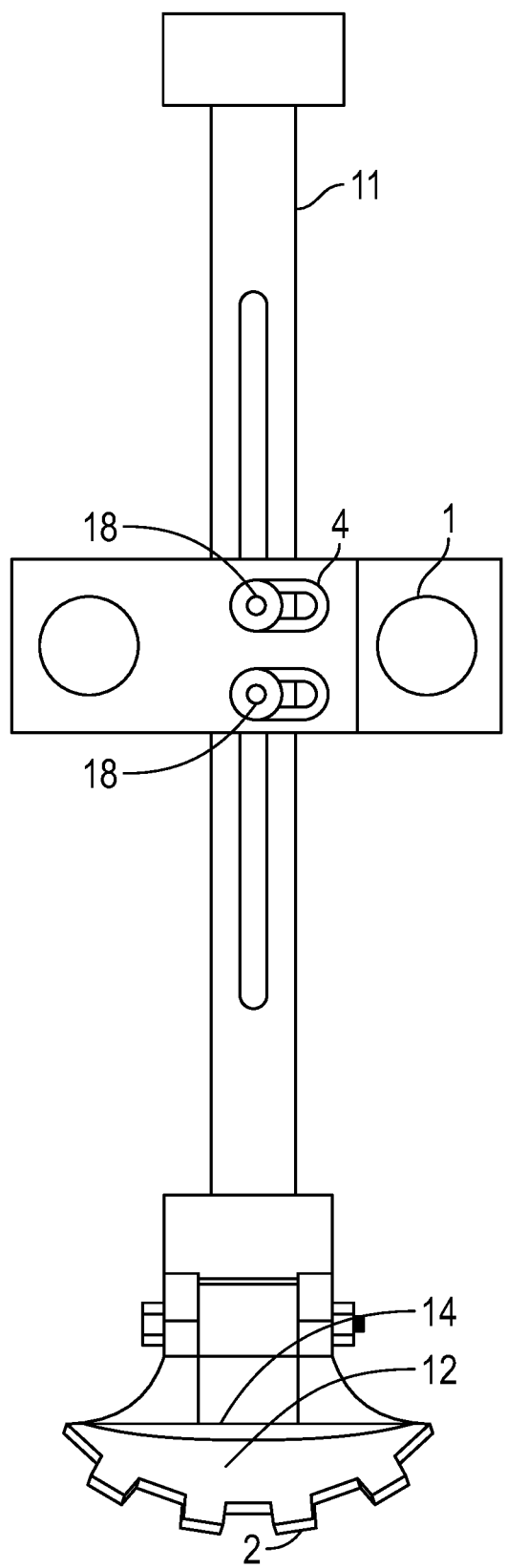
FIG. 6A illustrates a side view of an embodiment of the tire bar having a body formed from a single piece of metal.

Another example of a suitable locking structure 4 is shown in FIGS. 3F-3I, which includes a lug section locking bolt 18 and a lug section locking nut 21. The locking structure 4 can be locked by tightening the bolt 18 to the nut 21 shown in FIG. 3F. The locking structure 4 can be unlocked by loosening the bolt 18 from the nut 21. The bolt 18 has threads configured to accept internal threads in the nut 21. FIG. 6A shows an example using two bolts 18 and two nuts 21. In this example, the locking structure 4 has a dual purpose, a first purpose to lock the lug contact section 16 in a desired position along a length of the elongated body 11, and second to adjust the distance between the two lug connectors 1. FIGS. 3G and 3H show the distance between the lug connectors 1 being different. The lug contact section 16 comprises two parts, a first lug contact section part 16a and a second lug contact section part 16b that can be slid in relation to each other. The bolt 18 rests in a slot formed in the two lug contact section parts 16a and 16b. The two lug contact section parts 16a and 16b can be set in a desired position to provide a desired distance between the two lug connectors 1 and then the bolt 18 tightened to the nut 21 to lock the distance between the lug connectors 1 by locking the two lug contact section parts 16a and 16b together. Any suitable locking structure can be utilized to lock the two lug contact section parts 16a and 16b together.

While a cavity 3 and locking nut 4 is shown and described other types of mechanisms can be used to adjust the distance between the lug contact section 16 and traction section 12. For example, a spring 40 can be used to bias the lug contact section 16 towards the traction section 12 and during installation the lug contact section 16 can be pulled away from the traction section 12 until a desired length is achieved and after installation the spring 40 will provide tension on the luge contact section 16 towards the traction section 12, which is shown in FIG. 4A. Thus, when the tire 27 compresses when the outer traction surface 2 contacts the driving surface 30, the traction section 12 and lug contact section 16 can move towards one another and then as the tire 27 decompresses when the outer traction surface 2 no longer contacts the driving surface the traction section 12 and lug contact section 16 can move away from one another.

Figure 6B:
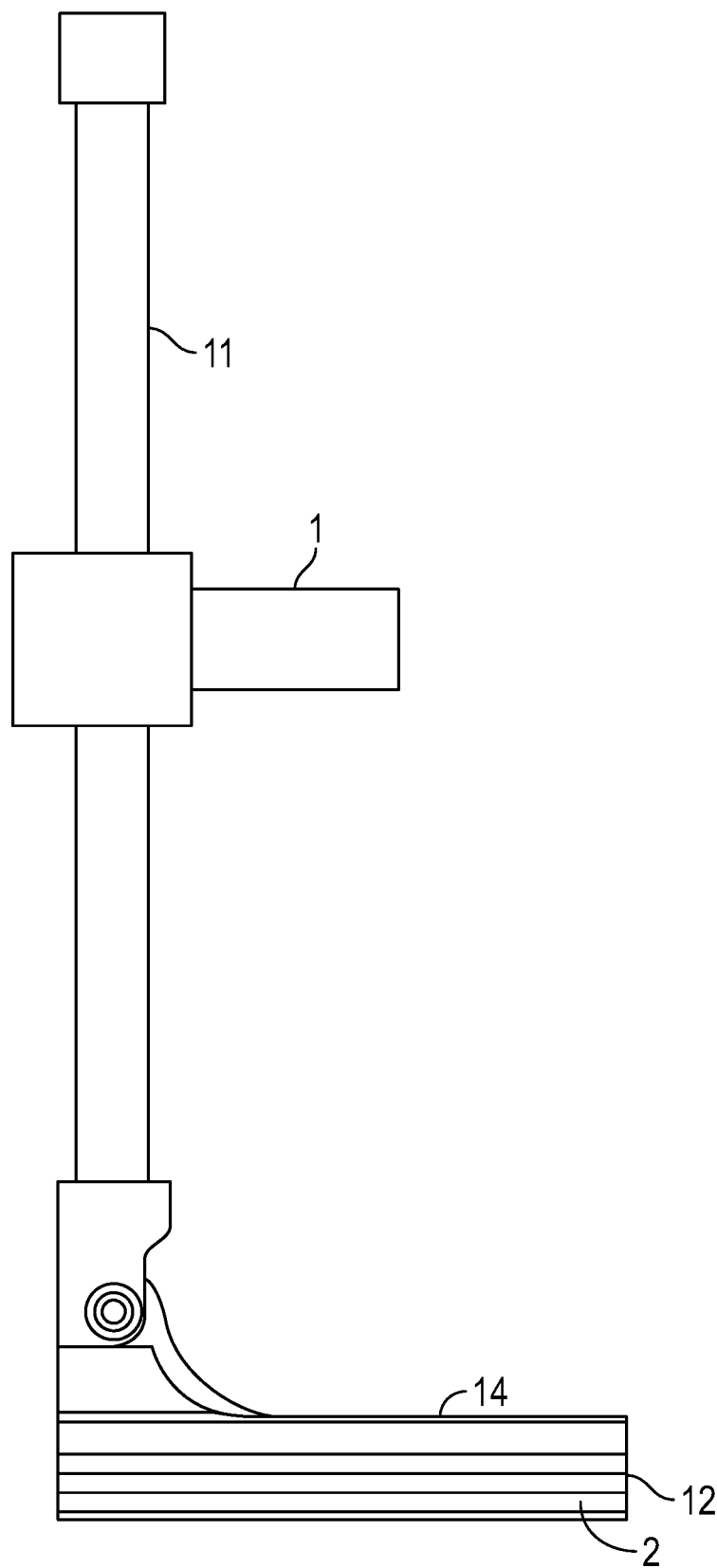
FIG. 6B illustrates a side view of an embodiment of the tire bar having a body formed from a single piece of metal.

FIGS. 1A through 5G show the elongated body 11 comprised of two rods or tubes. FIGS. 6A and 6B show another example where the elongated body 11 is formed from a solid piece of material, such as metal.

REFERENCE NUMBERS

1 Lug connector
2 Outer traction surface
4 Locking structure
5 Lug
6 4 Lug wheel
7 6 Lug wheel
8 5 Lug wheel
9 Locking bolt threads
10 Threads inside locking nut 8
11 Elongated body
12 Traction section
14 Inner surface configured to contact treads
16 Lug contact section
16a First part of contact section
16b Second part of contact section.
18 Lug contact section locking bolt
19 Locking bolt nut
20 Length traction section extends
21 Lug contact section nut
24 Vehicle wheel
25 Treads
26 No gap
27 Tire
28 Gap
29 Rim
30 Driving surface
40 Spring
50 Movable joint
51 Holes in elongated body 11
52 Joint bolt for movable joint
53 hole in the traction section 12
54 Joint nut
56 Stop
57 Stop While the claimed invention has been described in detail and with reference to specific embodiments thereof, it will be apparent to one of ordinary skill in the art that various changes and modifications can be made to the claimed invention without departing from the spirit and scope thereof.

The invention claimed is:

1. A tire bar comprising:
   an elongated body;
   a traction section at a first end of the elongated body and extending from a surface of the elongated body, the traction section is configured to be mounted over treads on a wheel mounted on a vehicle, the traction section has an inner surface configured to contact the treads of the wheel and an outer traction surface configured to contact a driving surface, the inner surface opposing the outer traction surface; and
   a lug contact section comprising a first lug connector configured to contact a first lug nut on the wheel and a second lug connector configured to contact a second lug nut on the wheel, the lug contact section comprises two parts that can be locked together in different positions to provide different distances between the first lug connector and the second lug connector, the lug contact section is configured to be movable along a length of the elongated body to vary a distance between the lug contact section and the traction section.

2. The tire bar according to claim 1, further comprising a locking structure configured to lock the lug contact section at a position on the elongated body.

3. The tire bar according to claim 1, wherein the traction section has a thickness between the inner surface and the outer traction surface to lift the vehicle.

4. The tire bar according to claim 1, wherein the elongated body defines a cavity along the length of the elongated body.

5. The tire bar according to claim 1, wherein the inner surface is a concave, curved shape.

6. The tire bar according to claim 1, wherein the wheel comprises a tire mounted a rim, the traction section is biased towards the lug contact section, and as the tire compresses the traction section moves towards the lug contact section and when the tire decompresses the traction section moves away from the lug contact section.

7. The tire bar according to claim 1, wherein the traction section extends from the elongated body substantially 90 degrees for a length of 1 to 16 inches and has a thickness of 1 to six inches.

8. The tire bar according to claim 1, further comprising a movable joint mounting the traction section to the elongated body, and the traction section being foldable into a storage position and an extended position.

9. The tire bar according to claim 7, further comprising a stop configured to stop the traction section in an extended position 90 degrees from the elongated body.

10. The tire bar according to claim 1, wherein the tire bar is configured to solely mount on the wheel by contact with the first lug nut and the second lug nut by the lug contact section and the inner surface of the traction section contacting the tread of the wheel so that the tire bar can be slipped on and off the wheel.

11. A method of unsticking a vehicle comprising:
providing a tire bar comprising an elongated body, a traction section at a first end of the elongated body and extending from a surface of the elongated body, the traction section is configured to be mounted over treads on a wheel mounted on the vehicle, the traction section has an inner surface configured to contact the treads of the wheel and an outer traction surface configured to contact a driving surface, the inner surface opposing the outer traction surface, a lug contact section comprising a first lug connector configured to contact a first lug nut on the wheel and a second lug connector configured to contact a second lug nut on the wheel, the lug contact section comprises two parts that can be locked together in different positions to provide different distances between the first lug connector and the second lug connector, the lug contact section is configured to be movable along a length of the elongated body to vary a distance between the lug section and the traction section;
adjusting a distance between the lug contact section and the traction section;
adjusting a distance between the first lug connector and the second lug connector so that the first lug connector aligns with the first lug nut and the second lug connector aligns with the second lug nut and locking the two parts together;
attaching the first lug connector to the first lug nut and the second lug connector to the second lug nut on the wheel and attaching the inner surface of the traction section to the treads on the wheel; and
rotating the wheel so that the traction section contacts the driving surface and moves the vehicle.

12. The method according to claim 11, further comprising locking the lug contact section in a location on the elongated body using a locking structure.

13. The method according to claim 11, further comprising rotating the wheel to lift the vehicle by a distance between the inner surface and the outer traction surface.

14. The method according to claim 11, further comprising a movable joint mounting the traction section to the elongated body, and the traction section being foldable into a storage position and an extended position, the method further comprising extending the traction section from a storage position to the extended position before mounting the tire bar on the vehicle wheel.

15. The method according to claim 11, wherein the traction section extends from the elongated body substantially 90 degrees for a length of 1 to 16 inches and has a thickness of 1 to six inches.

16. The method according to claim 11, wherein the tire bar is solely mounted on the wheel by contact with the first lug nut and the second lug nut by the lug contact section and the inner surface of the traction section contacting the tread of the wheel so that the tire bar can be slipped on and off the wheel.

17. The tire bar according to claim 1, wherein the wheel comprises a tire mounted on a rim, and the treads are tire treads.

18. The method according to claim 11, wherein the wheel comprises a tire mounted on a rim, and the treads are tire treads.

19. The tire bar according to claim 1, wherein the first lug connector is configured to fit over and around the first lug nut and the second lug connector is configured to fit over and around the second lug nut.

* * * * *